United States Patent [19]

Williams et al.

[11] Patent Number: 5,052,771
[45] Date of Patent: Oct. 1, 1991

[54] INTEGRATED ELECTRO-OPTICAL SCANNER

[75] Inventors: David J. Williams, Fairport; Joseph F. Revelli, Rochester, both of N.Y.

[73] Assignee: Eastman Kodak Company, Rochester, N.Y.

[21] Appl. No.: 632,195

[22] Filed: Dec. 21, 1990

[51] Int. Cl.$^5$ .................... G02B 6/10; G01D 15/10
[52] U.S. Cl. .................................. 385/8; 385/14; 385/130; 350/96.12; 346/76 L; 346/108
[58] Field of Search .............. 350/96.11, 96.12, 96.13, 350/96.14, 96.34, 355, 356; 346/33 A, 101, 108, 76 L, 132; 430/56, 66, 67; 355/1, 211, 213, 261; 250/227.2, 227.21, 570

[56] References Cited

U.S. PATENT DOCUMENTS

| | | | |
|---|---|---|---|
| 3,841,733 | 10/1974 | Ebersole | 350/96.14 |
| 4,367,925 | 1/1983 | Sprague et al. | 346/108 |
| 4,380,373 | 4/1983 | Sprague | 346/108 |
| 4,386,827 | 6/1983 | Scifres et al. | 346/108 |
| 4,396,252 | 8/1983 | Turner | 346/108 |
| 4,413,270 | 11/1983 | Sprague | 346/108 X |
| 4,421,387 | 12/1983 | Sprague | 350/96.14 |
| 4,560,994 | 12/1985 | Sprague | 346/108 |
| 4,614,408 | 9/1986 | Mir et al. | 350/96.14 X |
| 4,767,170 | 8/1988 | Mizutani et al. | 350/96.14 |
| 4,792,208 | 12/1988 | Ulman et al. | 350/96.34 |
| 4,841,311 | 6/1989 | Suzuki et al. | 346/108 |
| 4,948,225 | 8/1990 | Rider et al. | 350/96.34 |
| 4,955,977 | 8/1990 | Dao et al. | 350/96.34 |
| 4,979,789 | 12/1990 | Um | 350/96.14 |

Primary Examiner—Brian Healy
Attorney, Agent, or Firm—John L. James

[57] ABSTRACT

A fully integrated electro-optic page-scanner comprises an optically-transparent waveguide made from an electro-optic polymer, and a linear array of electrically-addressable, spaced, parallel electrodes for selectively altering the refractive index across pixel-sized portions of the polymeric waveguide. Parallel addressing of the electrodes in accordance with the intensity pattern of a line of pixels to be recorded acts to modulate the phase front of an optical wave propagating within the waveguide in accordance with such line intensity pattern. Schlieren optics, also integrated with the page-scanner, convert the phase-front-modulated wave to an intensity-modulated pixel pattern which can be imaged onto a moving photosensitive recording element to record a two-dimensional (page) of image information. By using an electro-optic polymer as the waveguide, certain disadvantages of prior art scanning devices are eliminated.

5 Claims, 2 Drawing Sheets

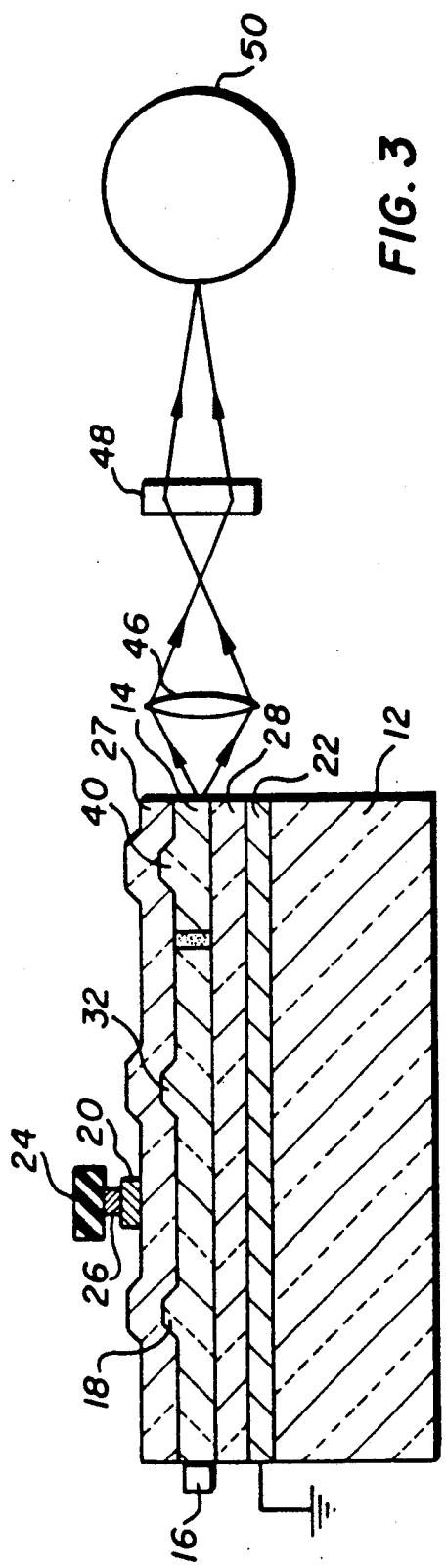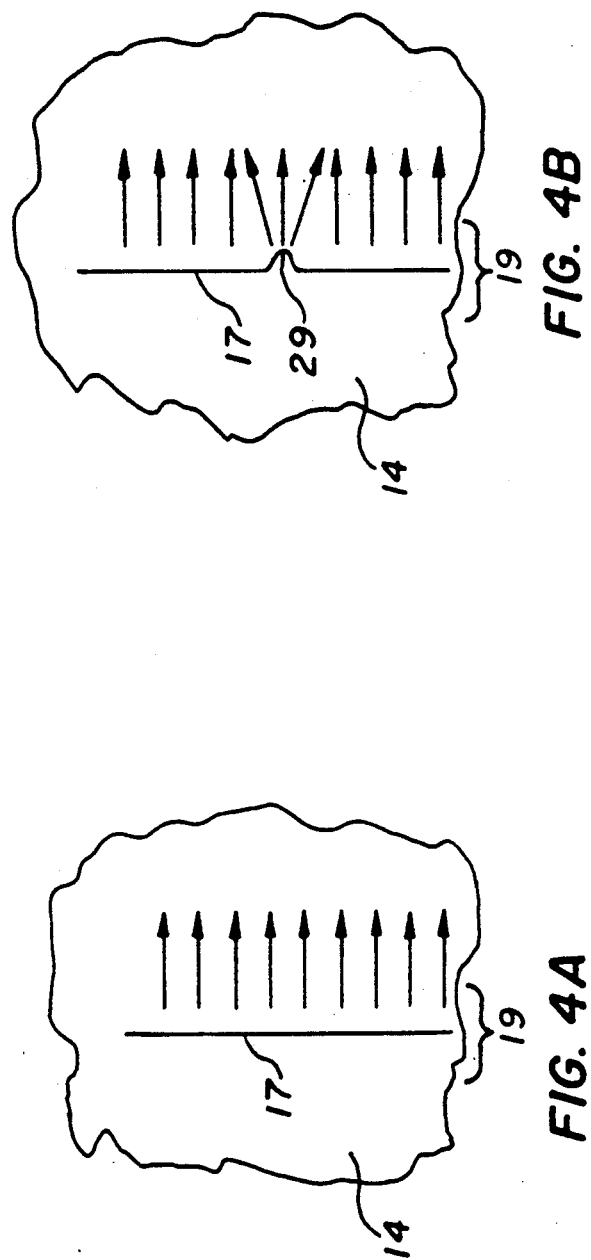

INTEGRATED ELECTRO-OPTICAL SCANNER

BACKGROUND OF THE INVENTION

This invention relates to an electro-optic scanning device for delivering information-modulated light to a photosensitive surface in an optical information recording apparatus, such as electrophotographic printers and copiers.

It is known to record optical information on a moving photosensitive medium by directing a sheetlike beam of collimated light through electro-optic crystal materials (e.g., lithium niobate or lithium tantalate) while modulating the phase front of the beam to form a scanning line of picture elements or "pixels" across the width of the recording medium. Such known apparatus is disclosed, for example, in U.S. Pat. Nos. 4,367,925 and 4,386,827. As disclosed in these references, the light beam enters a block of electro-optic crystal through a side face thereof, reflects off the base, and exits through the opposite side face. The base of the crystal supports a linear array of closely-spaced and parallel electrodes. Each pair of adjacent electrodes defines one pixel of information. When a voltage is applied between adjacent electrode pairs, fringing electric fields are established within the crystal. Such fields act to selectively alter the refractive index of the crystal, resulting in a phase change in that portion of the phase front of the collimated beam passing through the affected area. Schlieren optics are used to convert the phase-front modulated beam into a corresponding intensity-modulated pixel pattern representing an entire line of image information. By imaging such pattern onto a moving photosensitive recording element while periodically addressing, in parallel, all electrode pairs in the array with line information, a two-dimensional image is produced. Typically, the electrodes and their spacings measure from 1 to 30 microns in width, and it is possible to produce images having over 5000 resolvable pixels per line.

In order for the above-mentioned electro-optic scanning apparatus to produce high quality images, it is necessary that the light-modulating fringing electric fields produced between adjacent electrode pairs deeply penetrate the crystal and be highly uniform across the entire array. Such penetration and uniformity requires a good coupling between each electrode and the underlying portion of the crystal. To achieve such coupling, special care must be taken to polish the crystal surfaces, and special devices, such as elastomeric pads, are commonly used for biasing the electrodes against the crystal. However, even with such polishing and resilient biasing structures, it is difficult to obtain the necessary uniformity in the electric fields to assure that scanline image quality is not degraded. Other disadvantages associated with the above scanning apparatus are: (1) the relatively large electro-optic crystals required by such scanners are costly to produce and, (2) owing to the need to create relatively deeply penetrating fringing electric fields within the crystal, relatively high voltage must be applied between adjacent electrodes.

SUMMARY OF THE INVENTION

In view of the foregoing, an object of this invention is to significantly reduce both the complexity and cost of scanning devices of the type described and, further, to improve the uniformity of the phase-altering electric fields created within the electro-optic medium and, thereby, improve the quality of the resulting optical image.

This object is achieved by an integrated electro-optic scanning device which is capable of scanning an entire line of image information in the form of pixels across a recording medium. A preferred embodiment of such a scanning device comprises: a base support; a planar electrode layer disposed on a surface of such base support; a first buffer layer comprising a transparent layer of dielectric material disposed atop the planar electrode; and a planar, polymeric optical waveguide disposed atop the buffer layer. The polymeric waveguide comprises a thin film of poled, optically-transparent, electro-optic polymer material which is adapted to transmit therethrough, by multiple total internal reflections, (i.e. waveguiding), a sheet-like beam of collimated light. A second buffer layer comprising a transparent dielectric material is disposed atop the polymeric waveguide layer, and a plurality of spaced parallel electrodes, each defining a pixel of line information, are disposed atop the second buffer layer. Preferably the spaced parallel electrodes are formed by a photo-lithographic technique from a planar electrode which is used, during the manufacturing process, to pole the polymeric film. In use, an electric field is selectively provided between each of the spaced, parallel electrodes and the planar electrode on the opposite side of the polymeric film to produce a change in refractive index through selected portions of the interposed electro-optic polymer film. Such change in refractive index acts to modulate the phase front of collimated light passing through such selected portions in accordance with pixel image information to be recorded. Optical means are provided within the integrated waveguide structure for converting the phase-modulated wave front of the propagating beam to an intensity-modulated pixel pattern which can be imaged upon the surface of a light-sensitive recording medium.

By substituting a poled, electro-optic polymer for the electro-optic crystal which characterizes the prior art devices, certain technical advantages result. For example, since polymeric materials can be deposited on a substrate by spincoating and other similar techniques, it is possible to provide a fully integrated, monolithic structure comprising a plurality of thin films deposited on a supporting substrate. In such an integrated structure, the aforementioned difficulty of providing good electrical coupling between the pixel electrodes and the electro-optic material is eliminated. Because the polymer precisely conforms to its supporting surface, any non-uniformity in the phase-front-modulating electric fields caused by geometrical variations at the crystal/electrode interface is eliminated. Also, in an integrated structure, the need for fringing electric fields is eliminated since the pixel electrodes and ground electrodes can be arranged on opposite sides of the electro-optic polymer layer. This arrangement also allows lower voltages to be used in the creation of the phase-front modulating fields.

The invention and its various advantages will be better understood from the ensuing detailed description of preferred embodiments, reference being made to the accompanying drawings.

BRIEF DESCRIPTION OF THE DRAWINGS

FIG. 3 is an enlarged cross section of the FIG. 1 device taken along the section line 3—3 in FIG. 1.

FIG. 4A is a schematic diagram showing a uniform phase front of collimated light travelling through a portion of the beam-modulating area of the device of FIG. 1, and FIG. 4B is a schematic diagram similar to FIG. 4A showing a phase front being modified by an electric field formed in the same beam-modulating area.

DETAILED DESCRIPTION OF TH PREFERRED EMBODIMENTS

Figure 1:
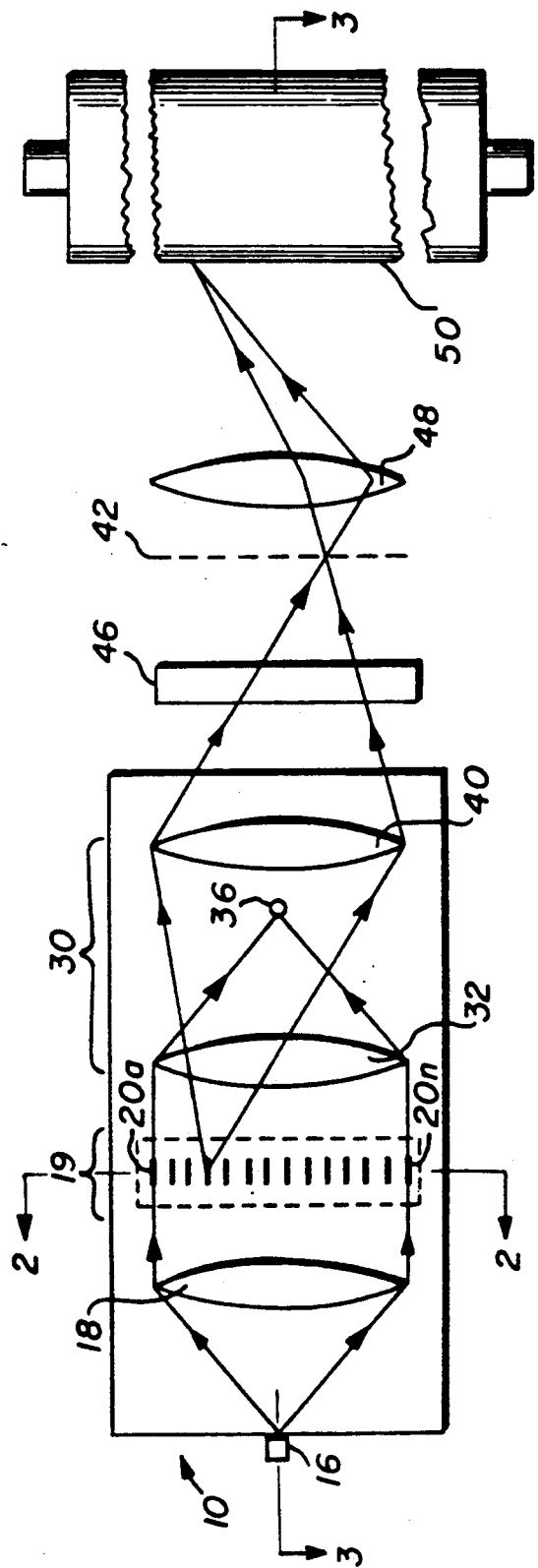
FIG. 1 is a schematic plan view of the primary optical components of a fully-integrated electro-optic device according to the invention.
Figure 2:
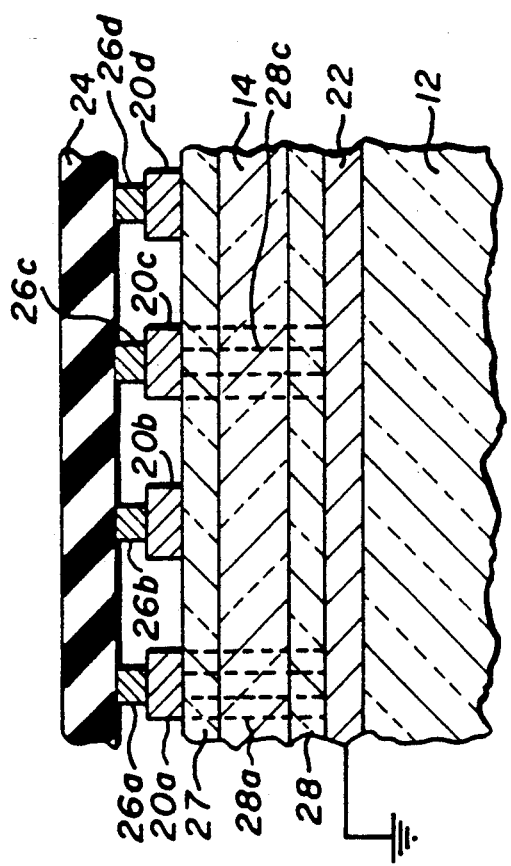
FIG. 2 is a greatly enlarged cross-section of a portion of the electrode area of the integrated device of FIG. 1, being viewed in the direction of section line 2—2 in FIG. 1.

With reference to FIGS. 1, 2, and 3, a preferred embodiment of a fully-integrated electro-optic page-scanning device 10 comprises a substrate 12 of glass or silicon having a thickness between 2 and 10 mm. Substrate 12 supports an optical waveguide in the form of a thin (e.g. 0.5 to 3 microns thick) film 14 of a poled, optically transparent, electro-optic polymer material. Suitable electro-optic polymers are those which exhibit a high second order polarization susceptability, such as the polymers disclosed in the commonly-assigned U.S. Pat. No. 4,792,208 (Ulman et al); U.S. Pat. No. 4,948,225 (Rider et al) and U.S. Pat. No. 4,955,977 (Dao et al), the disclosures of which are incorporated herein by reference. A laser diode 16, butt-coupled to one edge of the polymer film, serves as a source of a sheet-like light beam 17 which is guided in the plane of the waveguide film 14 by total internal reflection. It is not necessary, of course, that the light source be in the form of laser diode 16, or that the light source be directly coupled to polymer film 14. Instead, beam 17 may be generated by a remote laser source having an output beam which is optically coupled to the film by a conventional grating or prism coupler, as shown in the above-referenced patents.

A waveguide lens 18 (e.g. a mode-index, geodesic, fresnel or Luneberg lens) collimates the sheet-like beam 17 and directs it through a beam-modulating area 19 in which the electro-optic polymer material 14 is sandwiched between a plurality of closely-spaced upper electrodes 20a, 20b, 20c, 20d–20n, each being electrically addressable with a pixel of image information, and a lower planar electrode layer 22 which acts as an electrical ground plate. Preferably, the pixel electrodes 20a–20n and the opposing planar electrode 22 have a thickness between 0.5 and 5 microns and are spaced from the electro-optic polymer film by buffer layers, 27 and 28, respectively. These buffer layers comprise thin films (e.g. 0.5 to 5 microns thick) optically transparent dielectric materials (e.g. silicon dioxide or polymethylmethacrylate) having a refractive index which is somewhat lower than that of the polymer waveguide. The lower refractive index promotes total internal reflection of beam 17 within the waveguide and thereby prevents the absorption of light propagating within the waveguide by the electrode structure. Note, buffer layer 28 could be eliminated if the adjacent planar electrode 22 is sufficiently transparent and exhibits a suitably low refractive index. Such a transparent electrode could be indium tin oxide (ITO).

Electrical addressing of the individual upper electrodes 20a–20n is achieved by well-known electronic circuitry incorporated in a LSI silicon driver chip 24 (FIG. 2) having electrical conductors 26a–26n which are suitably placed in contact with upper electrodes 20a–20n. Suitable addressing circuitry is disclosed in U.S. Pat. No. 4,386,827. When none of the pixel electrodes are addressed (i.e. no voltage is applied), the sheet of light passes through region 19 as a plane wave, as shown in FIG. 4A. When the electronic driver circuit selectively applies a voltage to certain pixel electrodes (e.g., electrodes 20a and 20C in FIG. 2), discrete electric fields 28a and 28c are produced across the thickness of the polymer film, within modulating area 19. The presence of such an electric field changes the index of refraction in the electro-optic polymer (by means of the well-known Pockels effect) resulting in perturbations in the uniform phase front of collimated light beam 17. Each perturbed portion 29a on the phase front acts as a diffracting spot which, as illustrated in FIG. 4B, behaves as a point source of light.

Referring again to FIG. 1, Schlieren optics 30, which are also integrated within the waveguide structure in the form of mode-index or Luneberg optical elements, function to convert the phase-front-modulated light beam into a linear, intensity-modulated pixel pattern. The Schlieren optics comprises a lens 32 which focuses all of the non-diffracted light to an opaque light-absorbing stop 36, and lens 40 which focuses the light diffracted around stop 36 at an image plane 42, outside the integrated structure. Each of the pixel regions where the phase front has been disturbed appears as an illuminated pixel at image plane 42. Cylinder lens 46 collects light exiting from the waveguide structure and focuses it to a line image at image plane 42. Spherical lens 48 projects and magnifies the image of the linear pixel pattern onto a photosensitive surface, such as the photoconductive surface of electrophotographic drum 50. As such drum rotates, electrodes 20a–20n are periodically addressed, in parallel, with line information, thereby recording a two-dimensional (page) of image information on the drum surface.

The above-described monolithic structure can be manufactured by a series of conventional thin-film deposition techniques. First, the planar electrode 22 is formed atop substrate 12 by vapor or sputter depositing a metallic material (e.g. aluminum) to the desired thickness (0.5 to 5 microns). Buffer layer 28 is then formed atop the planar electrode 22 (at least in the light-modulating region 19). The manner in which buffer layer 28 is formed depends upon the material. When the buffer layer is polymethylmethacrylate (PMMA), it can be formed by a spin-coating technique; when it is silicon dioxide, it can be reactively sputtered. The polymer waveguide layer 14 is then spin-coated on the buffer layer 28 to the desired thickness (0.5 to 3 microns). At this point, a small hole (e.g. 0.5 to 5 microns in diameter) is milled in the waveguide at the location of stop 36. A light-absorbing dye is deposited in the hole to provide the light-stopping function. Lens 18, 32 and 40 are then formed atop the waveguide, such as by the process disclosed in the commonly assigned U.S. Pat. application No. 377,699 filed on July 10, 1989, pending, in the name of J. C. Brazas. A second buffer-layer 27 is formed atop the polymer layer, at least in region 19, in the same manner as buffer layer 28 is formed. Thereafter, a metal film (e.g. aluminum) is vapor- or sputter-deposited atop buffer layer 27 to a thickness of from 0.5 to 5 microns. This film, together with planar electrode 22, is used in the polymer-poling process in which a high voltage is applied across the polymer film while the polymer is heated to a high temperature. The uniform electric field produced by such voltage serves to align the polymer's molecular dipoles in a direction parallel to the applied field. With the electric fields still applied, the polymer layer is allowed to cool to room temperature, after which the voltage is removed and the dipoles are "frozen" in alignment, perpendicular to the plane of the polymer layer. After poling of the polymer layer, ion-milling or chemical etching is used to photolithographically delineate the pixel electrodes 20a-20n in the last-deposited metal film.

The above-described manufacturing process very effectively and uniformly bonds the electrode structure with the intervening electro-optic polymer and buffer layers. This bonding eliminates the prior art problem of nonuniformity between the electrodes and the surfaces of the electro-optic crystal material. As a result, considerably stronger and more consistent electric fields can be achieved in the phase-modifying area 19 of polymer film 14, resulting in improved pixel quality in the scan line output.

The invention has been described in detail with particular reference to certain preferred embodiments thereof, but it will be understood that variations and modifications can be effected within the spirit and scope of the invention.

What is claimed is:

1. An integrated electro-optic device for scanning a photosensitive medium with a focused line of light comprising a plurality of closely spaced, intensity-modulated pixels to record a two-dimensional image, said device comprising:

a base support;

a planar electrode layer disposed on a surface of said base support;

a first buffer layer disposed atop said first electrode layer, said first buffer layer comprising a transparent dielectric material;

an optical waveguide layer disposed on said base support and overlying said first buffer layer and said planar electrode, said waveguide layer comprising an optically-transparent, electro-optic polymer material said waveguide layer being adapted to transmit therethrough, by multiple total internal reflection, a beam of light in a direction perpendicular to the layer thickness;

a second buffer layer deposited atop said polymer layer said second buffer layer comprising a transparent dielectric material, said first and second buffer layers having a refractive index lower than the refractive index of said polymer layer;

means defining a plurality of spaced parallel electrodes atop said second buffer layer;

means for producing a uniform phase front of light within said polymer layer;

means for selectively applying an electric field between each of selected spaced, parallel electrodes and said planar electrode to cause selected portions of said polymer layer therebetween to perturb selected portions of said phase front in accordance with pixel image information to be recorded;

means for converting a perturbed wavefront of light within said waveguide layer to an intensity-modulated pixel pattern; and means for projecting an image of said intensity-modulated pixel pattern upon the surface of a photosensitive medium.

2. The electro-optic device of claim 1 wherein said converting means comprises Schlieren optics.

3. The electro-optic device of claim 1, wherein said electro-optical polymer film is deposited on said first electrode layer by spin-coating.

4. The electro-optic device of claim 1 wherein said producing means comprises a laser diode operatively-coupled to said electro-optic polymer layer.

5. An integrated electro-optic device for scanning a photosensitive medium with a focused line of light comprising a plurality of closely spaced intensity-modulated pixels to record a two-dimensional image, said device comprising:

an optical waveguide comprising an optically transparent electro-optic polymer, said waveguide being adapted to transmit, by total internal reflection, a beam of light in a direction perpendicular to the waveguide thickness;

means for producing a uniform phase front of light within said waveguide;

an array of electrodes comprising a planar electrode disposed on one side of said waveguide and a linear array of individual pixel-sized electrodes on the opposing side of said waveguide;

means for selectively applying an electric field between each of selected individual, pixel-sized electrodes and said planar electrode to cause selected portions of said waveguide to perturb selected portions of said phase front in accordance with pixel information to be recorded;

means for converting a perturbed wavefront of light within said optical waveguide to an intensity-modulated pixel pattern; and means for imaging said intensity modulated pixel pattern at an image plane outside said optical waveguide.

* * * * *